United States Patent Office 3,390,161
Patented June 25, 1968

3,390,161
PROCESS FOR SEPARATING TRACE QUANTITIES OF AN IMPURITY ISOTOPE FROM A MIXTURE OF ELEMENTS
Anthony V. Fraioli, Essex Fells, N.J., assignor to The Bendix Corporation, Teterboro, N.J., a corporation of Delaware
No Drawing. Filed Sept. 30, 1963, Ser. No. 312,341
8 Claims. (Cl. 260—439)

The present invention relates to a process for separating trace quantities of an impurity isotope from a mixture of elements and more particularly, to a process for separating gamma emitting isotopes from neutron irradiated nickel.

Radioactive $Ni^{63}$ is produced by neutron bombardment of natural nickel, or nickel isotopically enriched with $Ni^{62}$. Naturally occurring nickel is composed of four isotopes; namely, $Ni^{58}$ (approx. 68%), $Ni^{60}$ (approx. 27%), $Ni^{61}$ (approx. 1.2%), and $Ni^{62}$ (approx. 3.8%). When $Ni^{62}$ is subjected to neutron bombardment, a fourth isotope $Ni^{63}$ is formed which is a beta emitter. In addition to the formation of $Ni^{63}$, there is simultaneously produced trace quantities (at most 1%) of artificial radioisotopes of cobalt which are gamma emitters.

The radioactive isotope $Ni^{63}$, as a beta emitter, has many commercial uses. For example, it may be used as a cold cathode electron emitter in an ionization gauge. It may also be used to underlie a phosphor coating to excite the phosphor for luminescent panelling. However, in order to utilize the high and relatively stable activities of $Ni^{63}$ for instrument purposes, personnel must be protected from harmful gamma radiation. The total gamma radiation emanating from a device using $Ni^{63}$ should be less than 40 milliroentgen per week.

Cobalt can be separated from a solution containing nickel by conventional precipitating agents such as alpha-nitroso beta-napthol. However, separation of the gamma emitting isotopes of cobalt from irradiated nickel by precipitation is unsatisfactory because the residual equilibrium concentrations of the gamma emitting isotopes of cobalt in solution after precipitation leaves the gamma to beta ratio much too high.

Briefly, the process of the present invention for removing the gamma emitting istotopes of cobalt from a mixture of nickel isotopes comprises adding the stable isotope of cobalt to a solution of the mixture so that after precipitation of the cobalt, the equilibrium concentration of the unprecipitated cobalt which exists in solution in contact with the precipitate is enriched with the naturally occurring isotope and diluted with respect to the radioactive isotopes in exact proportion as the ratio of their concentrations in solution prior to precipitation.

An object of the present invention is to separate trace quantities of an impurity isotope from a mixture of elements.

Another object of the present invention is to provide a process for separating gamma emitting isotopes of cobalt from a mixture of nickel isotopes.

Another object of the present invention is to provide a process for separating the gamma emitting isotopes of cobalt from a mixture of nickel isotopes by adding the stable isotope of cobalt to a solution of the mixture so that after precipitation of the cobalt, the equilibrium concentration of the unprecipitated cobalt which exists in solution in contact with the precipitate is enriched with the naturally occurring isotope and diluted with respect to the radioactive isotope in exact proportion as the ratio of their concentrations prior to precipitation.

It is also an object of the present invention to provide for the separation of gamma emitting isotopes of cobalt from a mixture of nickel isotopes whereby the removed radioactive cobalt is in compact form thereby minimizing the expense in disposing of it.

Another object of the present invention is to provide a process whereby the removal of a radioactive impurity can be performed more quickly, more economically, and with smaller investment in equipment and supplies than by conventional ion exchange techniques or conventional techniques of magnetic separation.

These and other objects and features of the invention are pointed out in the following description in terms of the embodiments thereof.

Neutron irradiated natural nickel has a gamma to beta ratio of approx. 1/5000 and is composed of stable isotopes of nickel (approx. 95%), the radioisotope $Ni^{63}$ (approx. 3%), and artificial isotopes of cobalt and iron (approx. 2%) including the gamma emitting isotopes $Co^{58}$ and $Co^{60}$ (less than 1%). The ratio and percentages given will vary depending, e.g., on the neutron flux in the reactor during bombardment, and duration of bombardment and aging. The values given here are merely to illustrate a typical composition of commercially available irradiated nickel.

In accordance with the preferred embodiment of our invention, the neutron irradiated nickel to be processed is dissolved in a hydrochloric acid solution. Naturally occurring cobalt is then added to the solution as a chloride. Alpha-nitroso beta-napthol in 50% acetic acid is then added to the solution to form a precipitate comprising cobalt alpha-nitroso beta-naptholate. The equilibrium concentration of unprecipitated cobalt which exists in solution in contact with the precipitate is thereby enriched with the natural isotopes and diluted with respect to the radioactive isotopes in exact proportion as the ratio of their concentrations prior to precipitation. The precipitate is then filtered, digested and washed with 12% HCl, with the wash being added to the filtrate. The filtrate then contains the unprecipitated nickel isotopes and the residual equilibrium concentration of cobalt ions, isotopically mixed in a ratio of their concentrations prior to precipitation. To further decrease the concentration of the gamma emitting isotopes, the above steps are repeated. More naturally occurring cobalt is added to the filtrate to increase the ratio of the stable isotopes to gamma emitting isotopes in the filtrate. The cobalt is again precipitated by the addition of alpha-nitroso beta-napthol which results in the equilibrium concentration of the unprecipitated cobalt existing in solution in contact with the precipitate being further enriched with the natural isotope and further diluted with respect to the radioactive isotope. The steps of dilution and precipitation may be repeated again, if necessary, until the distribution of cobalt isotopes remaining in solution approaches the distribution present in naturally occurring cobalt.

The pH value of the solution to be treated should be below 4 in order to prevent precipitation of the nickel as the hydroxide. While other inorganic acids such as $HNO_3$ may be employed to dissolve the mixture, HCl is preferred so as to facilitate a subsequent plating process.

While alpha-nitroso beta-naphthol in 50% acetic acid is the preferred precipitating reagent, because of the stability and keeping properties of the reagent, alpha-nitro beta-napthol is also operative. Generally, the quantity of reagent added should be 1.2 times the theoretically necessary quantity to precipitate the cobalt present.

Precipitation is expedited and separation of the precipitate is facilitated if agitation and digestion (for approx. 3 hours) are employed prior to separation of the precipitate from the supernatant solution. While precipitation may be carried out at a temperature of between 25° and boiling temperature of the solution, a temperature of about 80° C. is preferred.

Generally, the quantity of stable cobalt added to the solution should be such that the ratio of stable isotopes to radioactive isotopes prior to precipitation is approximately $10^4$ parts to 1 part. This results in an equilibrium concentration of less than $10^{-12}$ grams of the gamma emitting isotopes of cobalt after three successive dilution precipitation steps which is well within safe handling requirments. Of course, the larger the amount of stable isotope added, the greater the dilution of gamma emitting isotope, thereby allowing the process to be carried out in one step. However, it is preferred to carry out the process by a series of dilution-precipitation steps rather than adding a larger amount of stable isotope and performing the process in one step because carrying out the process in a series of steps requires addition of a minimum amount of natural cobalt and allows working with a practical quantities. The inactive isotope preferably is added in a quantity such that there remains in the solution an inactive isotope to gamma emitting isotope ratio of at least 10 to 1.

An isotope of iron, $Fe^{59}$, which is a gamma emitter, may also be artificially formed when natural nickel is irradiated. This iron will be coprecipitated with the cobalt when either of the precipitating reagents, alpha nitroso beta napthol or alpha nitro beta napthol, is added to the nickel solution. Since the chemical distinction between Co and Fe is lost in a case where they are coprecipitated, the equilibrium concentration of the gamma emitting isotope of Fe remaining in solution will be diluted to the same extent as the gamma emitting isotope of cobalt. If desired, the stable isotope of iron rather than cobalt may be added to the solution prior to precipitation. Other than the addition of natural iron instead of natural cobalt, the process is carried out in the same manner as described herein. In this case, the equilibrium concentration of Co remaining in solution after precipitation will be diluted to the same extent as the gamma emitting isotope of iron.

Example

The following example is given by way of illustration only.

A 200 milliliter solution containing .1 gram of irradiated nickel in .5 N HCl is prepared. Approximately, $10^{-4}$ grams of gamma emitting cobalt isotopes are present in solution. One tenth of a gram of natural cobalt is added as the chloride to the solution so as to provide a 1000 to 1 ratio of the stable, natural isotope of cobalt to the gamma emitting isotopes of cobalt. The solution is heated to 80° C. Alpha-nitroso beta-napthol in 50% acetic acid is added to the solution until no further precipitation takes place. The solution is cooled and a little more reagent is added to make sure no more precipitate is formed. After digesting for three hours, the precipitate is filtered and washed with 12% HCl with the wash being added to the filtrate. The filtrate then contains the unprecipitated nickel and the residual equilibrium concentration of cobalt ions (approx. $10^{-5}$ grams). However, the residual concentration of cobalt is isotopically mixed in a 1/1000 ratio of gamma emitting isotopes to stable isotopes making the residual concentration of gamma emitting isotopes approximately $10^{-8}$ grams. Another .1 gram of naturally occurring cobalt is dissolved in the filtrate so as to provide a $10^7$ to 1 ratio of the natural isotopes of cobalt to the gamma emitting isotopes of cobalt. The cobalt and isotopes are again precipitated from solution by the addition of alpha-nitroso beta-napthol and filtered, leaving again $10^{-5}$ grams of mixed cobalt isotopes in the filtrate. The residual equilibrium concentration of cobalt in the filtrate is now isotopically mixed in a $10^{-7}$ ratio of gamma emitting isotopes to stable isotopes making the residual concentration of the gamma emitting isotopes remaining in the solution approximately $10^{-12}$ grams which is well within safe handling requirements.

It is to be understood that all matter contained in the above description and example shall be interpreted as illustrative and not limitative of the scope of this invention. Reference is, therefore, to be had to the appended claims for a definition of the limits of the invention.

What is claimed is:

1. A process for separating trace quantities of gamma emitting isotope of a metal selected from the group consisting of cobalt and mixtures of cobalt and iron from acid solutions having a pH value below 4 containing nickel and a metal selected from the group consisting of cobalt and mixtures of cobalt and iron, comprising adding an inactive isotope of the metal to said solution so that the ratio of inactive isotope to gamma emitting isotope is at least $10^4$ parts to 1 part, adding to said solution a precipitating reagent selected from the group consisting of alpha-nitroso beta-naphthol and alpha-nitro beta-naphthol to precipitate in said solution said gamma emitting isotope and said added inactive isotope, and separating the precipitate from the supernatant solution.

2. The process of claim 1 wherein said added inactive isotope is added in a quantity such that there remains in said supernatant solution an added isotope to the gamma emitting isotope ratio of at least ten to one.

3. A process for separating the gamma emitting isotopes of cobalt from an aqueous acid solution having a pH value below 4 containing nickel and cobalt ions comprising adding the inactive isotope of cobalt in ionic form to said solution so that the ratio of inactive isotope to gamma emitting isotopes is at least $10^4$ parts to 1 part, adding to said solution a precipitating reagent selected from the group consisting of alpha-nitroso beta-naphthol and alpha-nitro beta-naphthol whereby a cobalt precipitate forms, and separating said precipitate from the supernatant solution.

4. The process of claim 3 wherein the temperature of the solution is approximately 80° C.

5. The process of claim 3 wherein said precipitating reagent consists of alpha-nitroso beta-naphthol.

6. The process of claim 3 wherein said inactive cobalt isotope is added in a quantity to yield a residual equilibrium concentration of said gamma emitting isotope in said supernatant solution of less than $10^{-8}$ grams.

7. A process for reducing the concentration of the gamma emitting istopes of cobalt and iron in an aqueous acid solution containing nickel, cobalt and iron ions, comprising adding to said solution having a pH value below 4 in ionic form the inactive isotope of a metal selected from a group consisting of cobalt and iron so that the ratio of inactive isotope to gamma emitting isotope is at least $10^4$ parts to 1 part, adding to said solution a precipitating reagent selected from a group consisting of alpha-nitroso beta-naphthol and alpha-nitro beta-naphthol whereby the cobalt and iron are coprecipitated, and separating the consequent precipitate from the supernatant solution.

8. The process of claim 7 wherein said inactive isotope is added in a quantity such that there remains in said supernatant solution an inactive isotope to gamma emitting isotope ratio of at least ten to one.

References Cited

UNITED STATES PATENTS

| 2,259,641 | 10/1941 | Horning | 260—439 |
| 2,605,219 | 7/1952 | Jacobson | 176—16 |

OTHER REFERENCES

Szilard et al. "Nature," Sept. 22, 1934, p. 462.

Vincent, "Qualitative Analysis Laboratory Manual," the Sigma Press of Medical and Technical Summaries, Inc., Washington, D.C., 1960, p. 32.

OSCAR R. VERTIZ, *Primary Examiner.*

HERBERT T. CARTER, *Examiner.*